(12) United States Patent
Jin et al.

(10) Patent No.: US 9,729,316 B2
(45) Date of Patent: *Aug. 8, 2017

(54) UNIFIED BROADCAST ENCRYPTION SYSTEM

(75) Inventors: Hongxia Jin, San Jose, CA (US); Jeffrey Bruce Lotspiech, Henderson, NV (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1615 days.

This patent is subject to a terminal disclaimer.

(21) Appl. No.: 12/038,773

(22) Filed: Feb. 27, 2008

(65) Prior Publication Data

US 2009/0214031 A1 Aug. 27, 2009

(51) Int. Cl.
*H04L 9/00* (2006.01)
*H04L 9/08* (2006.01)
*G09C 5/00* (2006.01)

(52) U.S. Cl.
CPC ............. *H04L 9/0836* (2013.01); *G09C 5/00* (2013.01); *H04L 2209/606* (2013.01)

(58) Field of Classification Search
CPC . G06F 21/10; H04L 2209/606; H04L 9/0822; H04L 9/32; H04L 2209/60; H04L 9/0833; H04L 9/0891
USPC ........................................................ 380/277
See application file for complete search history.

(56) References Cited

U.S. PATENT DOCUMENTS

| 6,886,098 | B1 * | 4/2005 | Benaloh ........................ 713/193 |
| 7,039,803 | B2 | 5/2006 | Lotspiech et al. |
| 7,082,537 | B2 | 7/2006 | Muratani |
| 7,876,895 | B2 | 1/2011 | Jin et al. |
| 7,984,511 | B2 | 7/2011 | Kocher et al. |
| 2002/0133701 | A1 * | 9/2002 | Lotspiech et al. ............ 713/163 |
| 2003/0105956 | A1 * | 6/2003 | Ishiguro et al. .............. 713/158 |
| 2003/0185396 | A1 * | 10/2003 | Asano et al. ................. 380/277 |
| 2003/0220921 | A1 | 11/2003 | Fagin et al. |
| 2004/0098593 | A1 | 5/2004 | Muratani |
| 2004/0153941 | A1 | 8/2004 | Muratani |
| 2004/0156503 | A1 * | 8/2004 | Bell et al. ........................ 380/44 |
| 2004/0156509 | A1 * | 8/2004 | Nakano ............ G11B 20/00086 380/281 |

(Continued)

OTHER PUBLICATIONS

Boneh et al., "Fully collusion resistant traitor tracing with short ciphertexts and private keys",Eurocrypt '06, 2006, http://citeseer.ist.psu.edu./boneh06fully.html.

(Continued)

*Primary Examiner* — Gary Gracia
(74) *Attorney, Agent, or Firm* — Erik Huestis; Stephen Kenny; Foley Hoag LLP (57) ABSTRACT

A system and method is disclosed for performing unified broadcast encryption and traitor tracing for digital content. In one embodiment a media key tree is divided into S subtrees, the media key tree including media keys and initial values, which may be random values. The digital content is divided into a plurality of segments and at least some of the segments are converted into a plurality of variations. The random values are transformed into media key variations and a separate media key variant is assigned to each of the subdivided subtrees. A unified media key block including the media key tree is stored on the media.

2 Claims, 8 Drawing Sheets

(56) References Cited

U.S. PATENT DOCUMENTS

| | | | |
|---|---|---|---|
| 2005/0060334 A1* | 3/2005 | Kawamoto et al. | 707/102 |
| 2005/0278257 A1* | 12/2005 | Barr | G06F 21/10 |
| | | | 705/57 |
| 2006/0002198 A1 | 1/2006 | Funahashi et al. | |
| 2006/0056695 A1 | 3/2006 | Wu et al. | |
| 2006/0085343 A1 | 4/2006 | Lisanke et al. | |
| 2006/0239503 A1 | 10/2006 | Petrovic et al. | |
| 2006/0282676 A1 | 12/2006 | Serret-Avila et al. | |
| 2007/0005502 A1* | 1/2007 | Ohno | G11B 20/00086 |
| | | | 705/57 |
| 2007/0044159 A1* | 2/2007 | Ishiguro | 726/27 |
| 2007/0067242 A1* | 3/2007 | Lotspiech | G06Q 20/3829 |
| | | | 705/57 |
| 2007/0067244 A1* | 3/2007 | Jin | H04L 9/083 |
| | | | 705/59 |
| 2007/0133806 A1* | 6/2007 | Asano | 380/277 |
| 2007/0150963 A1* | 6/2007 | Lee et al. | 726/27 |
| 2007/0165853 A1* | 7/2007 | Jin et al. | 380/210 |
| 2007/0174637 A1* | 7/2007 | Lotspiech | G06F 21/16 |
| | | | 713/190 |
| 2008/0069353 A1 | 3/2008 | Lotspiech | |
| 2008/0137864 A1* | 6/2008 | Jin | G09C 5/00 |
| | | | 380/277 |
| 2008/0152134 A1* | 6/2008 | Asano | 380/45 |
| 2008/0199007 A1* | 8/2008 | Candelore | 380/201 |
| 2008/0205652 A1* | 8/2008 | Nakano | G11B 20/00086 |
| | | | 380/277 |
| 2008/0279376 A1* | 11/2008 | Jin | G06F 21/10 |
| | | | 380/202 |
| 2009/0010437 A1* | 1/2009 | Takashima et al. | 380/277 |
| 2009/0092249 A1* | 4/2009 | Doherty et al. | 380/201 |
| 2009/0323936 A1 | 12/2009 | Jin et al. | |

OTHER PUBLICATIONS

Hagiwara et al., "A short random fingerprinting code against a small number of pirates", Applied Algebra, Algebraic Algorithms and Error-Correcting Codes. 16th International Symposium, AAECC-16. Proceedings (Lecture Notes in Computer Science vol. 3857) pp. 193-202 (Feb. 20-24, 2006).

Seol, et al., "A scalable fingerprinting scheme for tracing traitors/colluders in large scale contents distribution environments", Intelligent Systems Design and Applications, 2005. ISDA '05. Proceedings. 5th International Conference Sep. 8-10, 2005 pp. 228-233.

Celik et al., "Collusion-resilient fingerprinting using random prewarping" Image Processing, 2003. ICIP 2003. Proceedings. 2003 International Conference vol. 1, Sep. 14-17, 2003 pp. I-509-12 vol. 1.

Tardos, G, "Optimal probabilistic fingerprint codes" Proceedings of the 35th Annual ACM Symposium on Theory of Computing, 2003, pp. 116-125.

* cited by examiner

Variant key table
50

| Column 1 | Column 2 | ... | Column m |
|---|---|---|---|
| $(K_{t1})e(K_{m1})$, 1 | $(K_{t7})e(K_{m1})$, 7 | | $(K_{t20})e(K_{m1})$, 20 |
| $(K_{t1})e(K_{m2})$, 1 | $(K_{t4})e(K_{m2})$, 4 | ... | $(K_{t27})e(K_{m2})$, 27 |
| $(K_{t1})e(K_{m3})$, 1 | $(K_{t2})e(K_{m3})$, 2 | | $(K_{t22})e(K_{m3})$, 22 |
| ⋮ | ⋮ | ⋮ | ⋮ |
| $(K_{t1})e(K_{mi})$, 1 | $(K_{t13})e(K_{mi})$, 13 | ... | $(K_{t23})e(K_{mi})$, 23 |
| ⋮ | ⋮ | ⋮ | ⋮ |
| $(K_{t1})e(K_{mn})$, 1 | $(K_{t7})e(K_{mn})$, 7 | ... | $(K_{t29})e(K_{mn})$, 29 |

UNIFIED BROADCAST ENCRYPTION SYSTEM

FIELD OF INVENTION

The present invention generally relates to systems and methods for protecting digital content from unauthorized use, and particularly to systems and methods for identifying devices involved in piracy of digital content and revoking secret keys used to pirate protected digital content.

BACKGROUND

The transition of the many types of media from analog to digital content offers new advantages to the consumer in quality and flexibility. Also, there is an increasing use of global distribution systems such as the Internet for distribution of digital assets including music, film, computer programs, photographs, games and other content. These trends have made it easy to produce and distribute flawless copies of content by content providers. Unfortunately, there is also a concurrent increase in the unauthorized copying, or pirating, of digital content, which has caused considerable economic losses to content providers. Effective countermeasures are important to the viability of businesses engaged in the distribution of digital media.

Piracy is a major concern and expense for content providers. To this end, industry consortia such as the 4C Entity (<www.4centity.com>) and AACSLA (<www.aacsla.com>) have been formed. These groups are licensing agencies that provide content protection tools based on Content Protection for Recordable Media (CPRM) and Advanced Access Content System (AACS), respectively. CPRM is a technology developed and licensed by the 4C group, comprising IBM, Intel, Matsushita, and Toshiba, to allow consumers to make authorized copies of commercial entertainment content where the copyright holder for such content has decided to protect it from unauthorized copying. AACS is a follow-on technology for the same purpose, under development by a group comprising IBM, Intel, Matsushita, Toshiba, Sony, Microsoft, Warner Brothers, and Disney.

CPRM and AACS protected files are encrypted with a key that is specific to a media identifier on the original storage medium (such as a DVD or CD-ROM etc.) of the protected file. Consequently, simply copying the content to another storage medium does not break the protection. The essential building block for CPRM and AACS is structure called a media key block (MKB) that is distributed together with the content. The MKB is a file containing encryptions of a single media key by a large number of keys known by compliant devices.

Each individual compliant device is assigned a set of unique device keys that allow it to decrypt the MKB and obtain the media key from the MKB. The media key is then combined with the media identifier and other values to derive a title key used to decrypt the protected digital content. If a device is revoked, using its device key to decrypt the MKB will get garbage instead of a valid media key. By this method, revocation is performed in a typical content protection system such as CPRM and AACS. Details of the CPRM and AACS technology are available from 4C and AACS. In particular, reference is made to the CPRM/CPPM specification (http://www.4centity.com/tech) and to the AACS specification (http://www.aacsla.com/specification).

The cryptographic keys required to indirectly encrypt and decrypt content are distributed from a key generation facility to device manufacturers and burn-into devices. Maintaining the secrecy of the cryptographic keys is essential for maintaining the integrity of a secure content protection scheme. For example, the device keys assigned to each device must be kept highly confidential. The consequences of accidental or malicious disclosure of the long-lived secret keys are grave; loss of these secrets can lead total breakdown of the copy protection schemes the secrets support and to potentially huge monetary loss for the participants of the copy protection scheme.

Fundamentally, the AACS protection depends on the interaction between tree-based device keys and the media key block, which allows unlimited, precise cryptographic revocation of compromised devices without danger of collateral damage to innocent devices. See for example, U.S. Pat. No. 7,039,803, which is incorporated by reference. One possible pirate attack on this system is that attackers reverse-engineer their devices, extract device keys from the devices, and build a clone device using those extracted device keys. To defend against this type of pirate attack and identify which devices are involved in building the clone device, forensic MKBs are carefully crafted. The forensic MKB is a special purpose MKB that is applied to the clone device. The outcome of applying the forensic MKB to the clone device is observed. After a sequence of applied forensic MKBs and observed outcomes, one can deduce which device keys are used in the clone device. Once the device keys are identified, they can be revoked in the newly-produced MKBs. In the art, finding which devices are involved in building the clone device is called "traitor tracing".

Another type of pirate attack in the above content protection system is an anonymous attack, wherein an attacker or group of attackers tries to hide their secret device keys and operate anonymously. In this attack, the attackers instrument their devices and collude to build a pirate copy of the decrypted plaintext content or the decryption key itself. The attackers can then redistribute the plaintext content or the decryption key. How does one know which devices are involved in constructing the pirate copy when the pirate copy is recovered? One solution is to differently watermark and differently encrypt each movie for each authorized device so that the watermarking and encryption information uniquely identifies the compromised box. Alas, this solution is not feasible because of the excessive computing effort and transmission bandwidth required to prepare and transmit individualized movies. The distribution system is economical only if the movies can be distributed over broadcast channels; i.e., every receiver gets substantially the same data at the same time.

In the art, there is another type of traitor tracing technology that is used to identify which devices are involved in constructing the pirate copy of the content. In one particular instance of this approach, an original version of each movie file is augmented before being broadcast. Specifically, the file that is actually broadcast has had at least one critical file segment replaced by a set of segment variations. Each file segment variation is differently encrypted and also differently watermarked prior to encryption, although the entire file may be watermarked as well. All the variations in one segment are identical for viewing purposes though digitally different. A particular receiver, or player, using an assigned secret cryptographic key can decrypt only one of the variations in each segment. All legitimate receivers with valid secret keys can play the content through different segment combinations. If the receiver is compromised and is used to illegally rebroadcast either the keys or the segments themselves, it is possible to deduce which receiver or receivers have been compromised after recovering a sufficient number of pirated content or keys.

After the devices involved in the anonymous attack are identified, the device keys associated with these devices can be revoked in future content releases. To enable revocation, a structure similar to the MKB is used. For example, in AACS, the assigned secret cryptographic keys that enable traitor tracing for anonymous attack are called sequence keys, similar to device keys. The structure that can incorporate revocation information is called a sequence key block (SKB). Any compliant device can use its valid sequence key to process the SKB and obtain a key that can indirectly decrypt the content.

Although conventional traitor tracing technology has proven to be useful, it would be desirable to present additional improvements. Current content protection systems such as AACS utilize two separate systems, the media key block and the sequence key block. The media key block is tree based and is used to thwart an attack in which a clone device is constructed from a set of pirated device keys. The clone device can be illegally used to copy copyrighted content and can be sold on the black market. The sequence key block is matrix-based, and is used to thwart an attack in which sequence keys, title keys, or an entire decrypted movie is re-distributed. Utilizing two separate systems requires additional storage on media and calculation by the media device, affecting performance of a digital content system.

Furthermore, deploying two separate systems is inefficient and time consuming. Using media key blocks to revoke traitors provides good revocation provided that traitors can be identified when clone devices are recovered. However, this type of tracing based on forensic MKBs may take an excess amount of time and the scheme can be overwhelmed. On the other hand, using sequence key blocks provides good tracing, but revocation is limited. Further, as sequence keys are revoked in the sequence key block, tracing capability is degraded.

One approach to addressing these issues is disclosed in U.S. patent application Ser. No. 11/746,491, now U.S. Pat. No. 7,876,895, entitled "System, Method, and Service for Performing Unified Broadcast Encryption and Traitor Tracing for Digital Content", and assigned to the same assignee as the present application. This patent application discloses how a player's device keys could be used for both the clone attacks and for the anonymous attacks. This eliminates the need for sequence keys and sequence key blocks (at least for newly manufactured devices). Basically, this unified broadcast encryption technique uses the media key block to directly produce the media key variant. In turn, the media key variant can be used in a backwards way to calculate the actual media key, which is still used to protect the bulk of the movie. In addition to the obvious simplicity of this approach, the forensics against both kinds of attacks is substantially increased While the unified broadcast encryption as disclosed in U.S. patent application Ser. No. 11/746,491, now U.S. Pat. No. 7,876,895, offers a number of advantages, there are some limitations to the technique. For example, the number of media key variants is limited to about 1024.

Further, there is a need for additional improvements to current techniques for dealing with pirated media. For example, Blu-Ray technology has a Java program on the disc as well as a "security VM program", called BD+. The details of BD+ are confidential; however, it has been described by its proponents as being very similar to the publicly-described technology, called Self-protected Digital Content (SPDC), developed by Cryptography Research, Inc. The purpose of this VM machine program is to "sniff" the platform it is running on and try to determine if it is a circumvention platform or a legitimate player. If it is the former, it refuses to allow the movie to play.

It turns out that SPDC technology has a flaw: how does it determine it is on a problematic platform to begin the sniffing? A public-key infrastructure has been proposed, where the platform presents credentials to the virtual program on the disc. The problem is that the program has to check the credentials, using the basic instructions that are completely under control of the potential circumvention platform. It is not clear that is even possible against a cleverly-designed circumvention program.

Accordingly, there is a need for an improved system and associated method for performing unified broadcast encryption and traitor tracing for digital content that provides unified broadcast encryption without its limitation on the number of media key variants. There is also a need for such as system that would SPDC systems, such as BD+, so that the platform must tell the truth about where it is in the media key block or else the virtual program will not correctly transform the media key.

SUMMARY OF THE INVENTION

To overcome the limitations in the prior art briefly described above, the present invention provides a method, computer program product, and system for performing unified broadcast encryption using software key conversion data.

In one embodiment of the present invention, a processor-implemented method of performing a unified broadcast encryption and a traitor tracing for digital content comprises: dividing a media key tree into S subtrees, the media key tree including media keys and initial values; dividing the digital content into a plurality of segments and converting at least some of the segments into a plurality of variations; transforming the initial values into media key variations; assigning a separate media key variant to each of the subdivided subtrees; storing a unified media key block including the media key tree on the media; decrypting the digital content by reading and processing the media key block on said media to obtain the media key variations required for each of the variations of the digital content; and transforming the initial values using a program on the media into media key variations.

In another embodiment of the present invention, a processor-implemented system for performing a unified broadcast encryption and traitor tracing for a digital content stored on digital media comprises: a unified media key block module including a media key tree having media keys and initial values, the initial values being transformable into media key variations; the unified media key block module dividing the digital content into a plurality of segments and converting at least some of the segments into a plurality of variations; and a transformation unit for transforming the initial values into media key variations, wherein the unified media key block module generates a unified media key block encrypting the digital content.

In a further embodiment of the present invention a method for encrypting digital content, comprises: receiving digital content; introducing a plurality of content variations into the media; generating a media key tree including media keys and initial values; transforming the initial values into media key variations; assigning a separate media key variant to subtrees within the media key tree; storing a unified media key block including the media key tree on the digital media; calculating at least one title key and identify at least zero content variations; and the unified media key block module decrypting the particular variation of the segment, for each segment in the content, using the calculated title key.

In another embodiment of the present invention, a computer program product comprises a computer usable medium having a computer readable program, wherein the computer readable program when executed on a computer causes the computer to: generate a media key tree including media keys and initial values; divide the digital content into a plurality of segments and convert at least some of the segments into a plurality of variations; transform the initial values into media key variations; assign a separate media key variant to each of the subdivided subtrees; and store a unified media key block including the media key tree on the media.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there are described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

The present invention overcomes the problems associated with the prior art by teaching a system, computer program product, and method for performing improved unified broadcast encryption with efficient revocation and tracing.

In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The invention addresses problems associated with the piracy of digital content. The invention utilizes software key conversion data (KCD), also referred to as soft KCDs, in combination with the above-described unified media key blocks. With soft KCDs there is a program on the movie disc that also acts to transform the media key. Different devices can have different transformations, because different parts of the media key block could calculate different initial values. In contrast, in prior systems, data for this transformation is encoded in a secret way on the move disc. It is thus a hardware KCD, because it requires special disc drive hardware to read the data.

The present invention has significant advantages over current unified media key block systems art in that it overcomes the limitation on the number of media key variants of about 1024 variations. In the present invention the number of such variations is limited only by the size of the media key block. For example, a media key block with 32,000 variations would be very practical. Also, the present invention overcomes the above-described problem with SPDC by requiring an attacker platform to tell the truth about which of the keys it has, or the virtual program will not work. As a result, the "sniffing" feature of SPDC is enabled.

Figure 1:
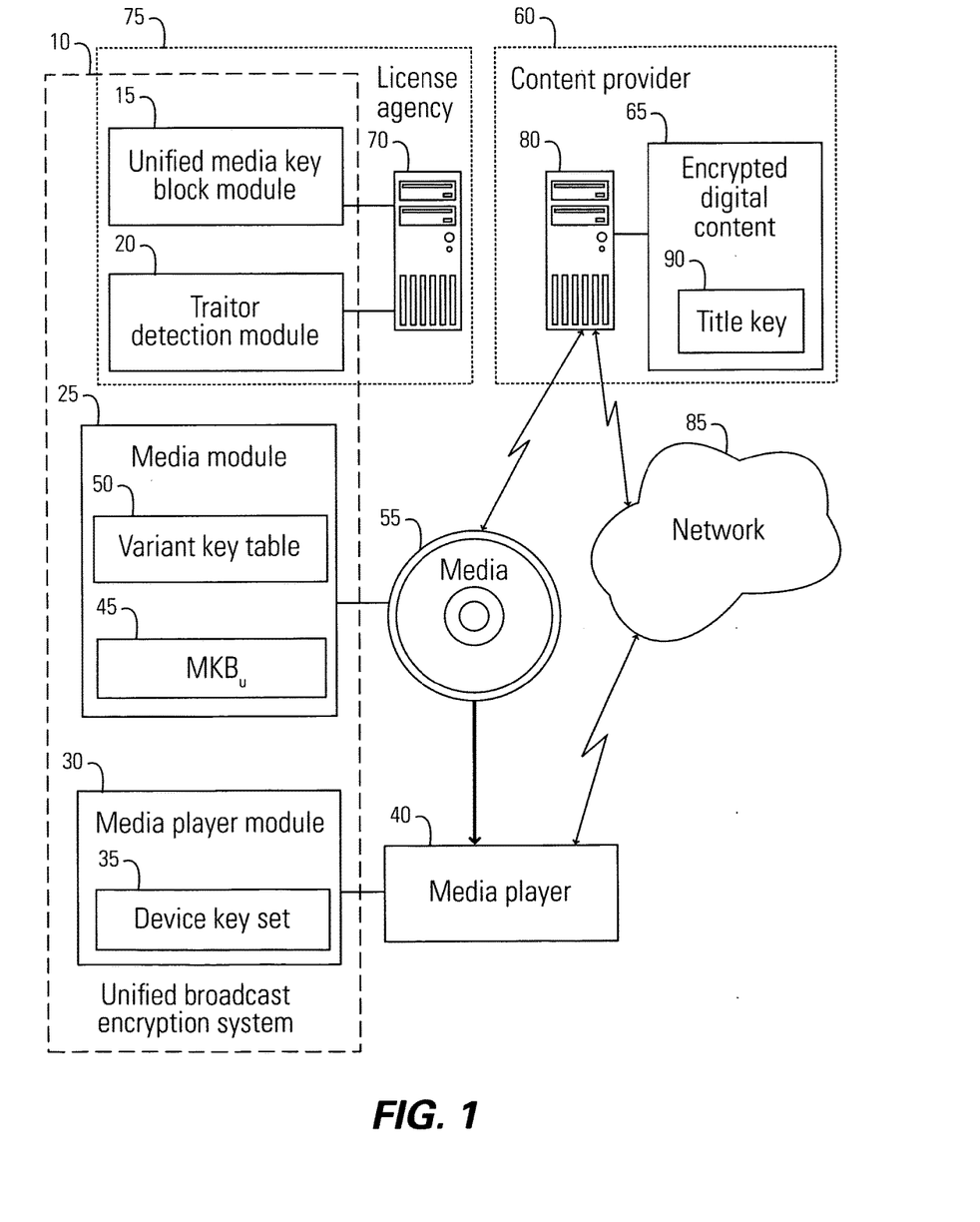
FIG. 1 is a schematic illustration of an exemplary operating environment in which a unified broadcast encryption system can be used.
Figure 2:
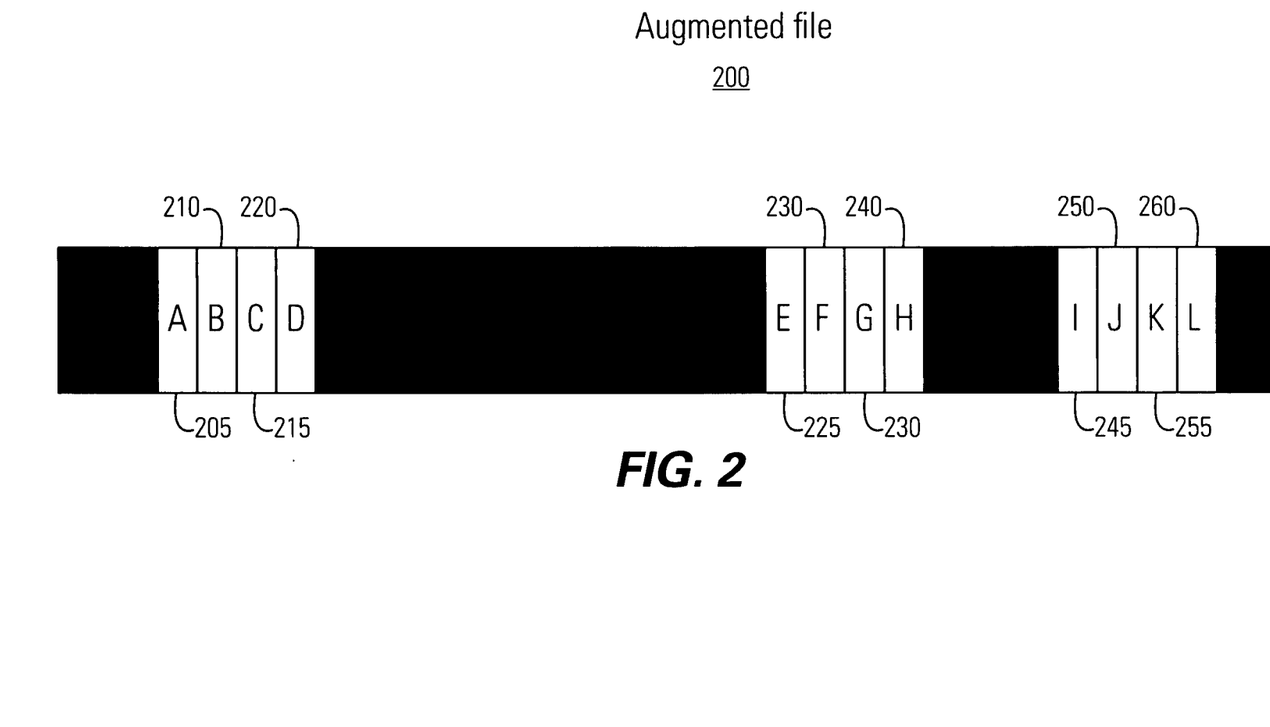
FIG. 2 is a block diagram of an encrypted content using an augmented file and encrypted variations as utilized by the unified broadcast encryption system of FIG. 1.
Figure 3:
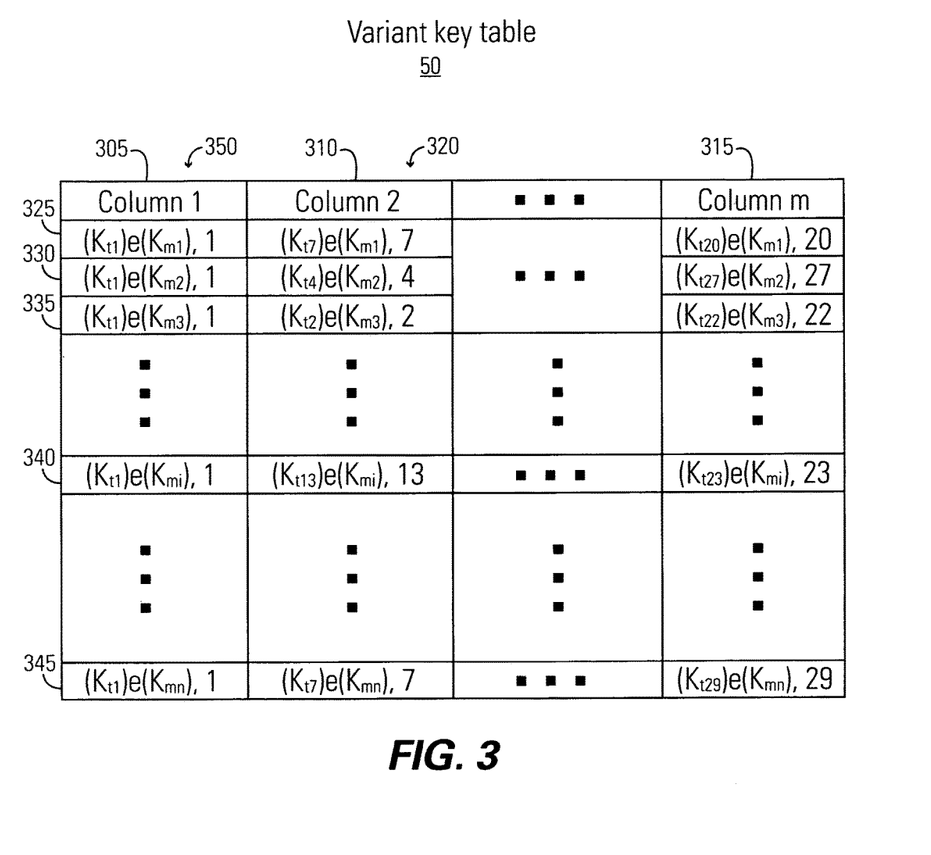
FIG. 3 is a diagram of an exemplary variant key table used by the unified broadcast encryption system of FIG. 1 to decrypt encrypted content.

FIG. 1 portrays an exemplary overall environment in which a 25 system 10, for performing unified broadcast encryption and traitor tracing for digital content according to the present invention may be used. The present invention may be used in a variety of content protection applications including but not limited to DVDs, downloaded content, software and others. FIGS. 1-3 show the system 10 for performing unified broadcast encryption as disclosed in U.S. patent application Ser. No. 11/746,491, now U.S. Pat. No. 7,876,895, entitled "System, Method, and Service for Performing Unified Broadcast Encryption and Traitor Tracing for Digital Content", the contents of which are incorporated herein by reference. A summary of this system 10 is presented in FIGS. 1-3, however, additional details may be found in U.S. patent application Ser. No. 11/746,491, now U.S. Pat. No. 7,876,895.

System 10 comprises a unified media key block module 15, a traitor detection module 20, a media module 25, and a media player module 30. The media player module 30 comprises a device key set 35 that is uniquely associated with a media player 40. The media player 40 may comprise any one of a number of devices used to play digital media, including, but not limited to DVD players, personal computers, movie rental boxes which are allowed to play a move for a limited period of time, and others. The media player module 30 further comprises a software programming code or a computer program product that is typically embedded within, or installed on the media player 40.

The media module 25 comprises a unified media key block 45 (interchangeably reference herein as MKBu 45) and a variant key table 50. The unified media key block 45 comprises a subset of available device keys and a data part in which each of the subset of device keys individually encrypts a set of media key variants. For example, the subset of device keys may be organized in a tree structure, such as in the subset-difference broadcast encryption scheme, although all broadcast encryption schemes are within the scope of this invention. The media module 25 comprises a software programming code or a computer program product that is saved onto a media 55.

The unified media key block module 15 generates one or more unified media key blocks for use by a content provider 60 to place on the media 55 together with an encrypted digital content 65 (interchangeably referenced herein as encrypted content 65). The unified media key block module 15 comprises a software programming code or a computer program product that is typically embedded within, or installed on a server 70 that belongs to a separate facility, for example, a license agency 75. Alternatively, system 10 can be saved on a suitable memory or storage medium such as a diskette, a CD, a DVD, a hard drive, or like devices.

The traitor detection module 20 identifies the device keys that have been compromised by a traitor or have been pirated. The traitor detection module 20 passes the identified device keys to the unified media key block module 15 to revoke those identified device keys from any future unified media key blocks, preventing further piracy by that traitor or attacker. The traitor detection module 20 comprises a software programming code or computer program product that is shown, for illustration purposes only, as embedded within, or installed on server 70 of the license agency 75. Alternatively, the traitor detection module 20 may be installed in a separate facility other than the one that issues unified media key blocks to content providers.

The media player 40 can access a server 80 of the content provider 60 through a network 85 to obtain the encrypted digital content 65 and a title key 90. The title key 90 (interchangeably referenced herein as Kt 90) allows the media player 40 to decrypt and play the encrypted content 65 after the encrypted content 65 has been recorded to media 55. The title key 90 is encrypted, and requires the media player 40 to correctly process the unified media key block 45 to decrypt and use the unified media key block 45. The content provider 60 may record the encrypted content 65 and the encrypted title key 90 directly to the media 55 such as, for example, a CD or DVD. A user may then obtain the encrypted content 65 by, for example, purchasing the CD.

The media player 40 comprises any compliant module that can verify the physical presence of a media 55 such as, for example, a disk. A compliant module is one that follows the usage rules of the media module 25 that are cryptographically bound to media 55. For example, a compliant recorder does not record content encoded "do not copy".

FIG. 1 illustrates an exemplary application of system 10 referenced as "electronic sell-through" in which a consumer obtains the encrypted content 65 by downloading the encrypted content 65 from the content provider 60 onto a media 55 such as recordable disk in the home of the consumer. While described in terms of an "electronic sell-through" application, it should be clear that system 10 is applicable as well to, for example, any application in which authentication is important and the authenticators are restricted to a subset of the participants. Furthermore, while illustrated as providing secure encryption of content for delivery to media, it should be clear that system 10 is applicable as well to, for example, any type of content delivery.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. The computer program product comprises the instructions that implement a method of system 10. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

FIG. 2 illustrates a diagram of a conventional modified or augmented distributed file 200 comprising encrypted content 65, shown in FIG. 1. This file is described in detail in U.S. patent application Ser. No. 10/315,395, filed Dec. 9, 2002, and entitled "Method for Tracing Traitors and Preventing Piracy of Digital Content in a Broadcast Encryption System", which is incorporated by reference herein. The augmented file 200 is the modified version of an original file to be broadcast or distributed on prerecorded media. The augmented file 200 comprises sets of file variations that replaced critical file segments. For example, a first critical file segment has been replaced with variations 205, 210, 215, and 220, while a second critical file segment has been replaced with variations 225, 230, 235, and 240, and so forth.

Each file segment variation is a copy of the particular corresponding critical file segment that has been differently watermarked and differently encrypted using a variation encrypting key (called title key for the variation). Each file segment variation is identified by a text designation in this application (e.g. A, B, C . . . etc.) for clarity, but in practice binary numbers are generally employed for this purpose. Furthermore, while four variations are shown for each critical file segment, in operation any number of variations may replace a critical file segment. In one embodiment, approximately 12 to 16 variations are used per critical file segment, with approximately 250 to 1000 variations per augmented file 200.

The number of critical file segments and the number of variations employed depends on the properties of the file and its audience. For movies, one may select a single critical file segment and have several hundred file segment variations; however, attackers may simply choose to omit that single critical file segment in a pirated copy of the file, in hopes that viewers may not find such a glitch to be overly annoying. A pirated movie with, for example, 15 missing critical 5-second scenes is most likely too annoying to any viewer for it to be of any commercial value. Thus, the illegally broadcast movies are either substantially disrupted or the attackers must incorporate some of their file segment variations, which facilitates unified traitor tracing.

Each intended receiver of the broadcast requires variation selection information to choose a particular combination of file segment variations for each file. In terms of a movie rental box scenario, each movie rental box knows, for each movie, which set of variations to plug into the spaces where critical scenes existed in the original movie. The particular arrangement of unmodified file content and file segment variations within the augmented file 200 shown is not critical but is merely intuitive.

The variations facilitate unified traitor tracing in a commercially viable (i.e. low bandwidth overhead) manner. If a pirated version of a file is found, say on the Internet, the identity of the particular movie rental box (or boxes) that was used to create the pirated version is of keen interest to the broadcaster and/or content creator (e.g. copyright owners). The broadcaster and/or content creator may institute legal proceedings against the culprit, and would certainly want to refuse to send new decryption keys to the compromised boxes to prevent future thievery. If different boxes are assigned different combinations of file segment variations to use, an analysis of a pirated file can help determine which boxes were used as part of an anonymous attack.

In the event that all of the file segment variations in a redistributed version of a file match the combination of file segment variations assigned to only a single movie rental box, conventional systems normally identify that box as being the source of the redistributed file. However, attackers are becoming increasingly sophisticated and may choose to employ a number of boxes to produce a pirated version of a file via collusion, wherein each box contributes some information or content used to produce the illicit copy after enough such information or content has been accumulated.

In conventional broadcast encryption technologies, a media key block resides on a physical piece of media such as a DVD. The media player uses a device key uniquely associated with the media player to decrypt the media key block and obtain a media key, Km, and a title key, Kt. In the example of AACS that deploys both a media key block system and a sequence key block (SKB) systems, the media key is used as input for processing a sequence key block to obtain a media key variant, Kmv. The title key is used to decrypt segments in the augmented file 200. The media key variant is used to obtain the title key for each segment.

In contrast, system 10 utilizes the variant key table 50 in which a different title key may be used for each variation in a segment in the augmented file 200. Rather than having a separate sequence key block, system 10 merges indirection concepts used by the sequence key block and the title key into the variant key table.

FIG. 3 illustrates an exemplary variant key table 50. The variant key table 50 comprises one or more exemplary columns such as a column 1, 305, a column 2, 310, and a column m, 315, collectively referenced as columns 320. The variant key table 50 comprises rows such as a row 1, 325, a row 2, 330, a row 3, 335, a row i, 340, through a row n, 345, collectively referenced as rows 350. Rows 350 are generically referenced as the row i, 340. Each of the rows 350 in the variant key table 50 corresponds to a media key variant. For example, the row i, 340, corresponds to a media key variant i. Each of the columns 320 in the variant key table 50 corresponds to a segment in the encrypted digital content 65. For example, column 1, 305, corresponds to a segment in the encrypted digital content 65 in which there are no variations, and every media player calculates the same title key. The column 2, 310, and the column m, 315, each corresponds to segments in the encrypted digital content 65 of which there are variations; different media player modules such as the media player module 30 may use different title keys to decrypt the variations. The assignment of columns is for exemplary purposes only. The encrypted digital content 65 may comprise one or more segments without variations and zero or more segments with variations. Each segment of the encrypted digital content 65 has a corresponding column in the variant key table 50.

Entries in the variant key table 50 comprise two values, an encrypted title key and a variant number. These values are denoted as "(Ktx)e(Kmi),x" in FIG. 3. For example, in column 1, 305, all the entries show variant 1, but in each entry the title key (Kt1) corresponding to this segment is differently encrypted: the title key, Kt, is encrypted with the media key variant. The column 2, 310, corresponds to a point in the movie in which there are variations. The column 2, 310, comprises different variant numbers, one variant number for each variation. In general, there are fewer variations at any given point in the movie than there are media key variants; consequently contents of rows may repeat within the variant key table 50 as illustrated by the row 1, 325, and the row n, 345.

The media player module 30 accesses a row in the variant key table 50 based on the media key variant of the media player module 30. For example, if the media player module 30 has media key variant i, the media player module 30 uses row i, 340, in the variant key table 50. From entries in the accessed row, the media player 40 is able to decrypt title keys for each segment in the encrypted digital content 65 and to identify which variation to use in those segments that have more than one variation. The media player 40 obtains the necessary media key variant number from the unified media key block 15 by, for example, a special field. Alternatively, low-order bits of the media key variant can be used to identify the media key variant number. This approach slightly reduces the strength of the key, but allows compatibility with conventional (non-unified) media key blocks.

If a single value is encrypted by many different keys, as is being done especially in the column 1, 305, of the example variant key table 50, system 10 is susceptible to an attack called the Birthday Paradox Attack. It is a simple matter to avoid this attack by, for example, XORing the title key with the row number before encrypting it with the media key variant. This normal practice is not shown in FIG. 3, for purposes of clarity, but may used in one embodiment.

Figure 4:
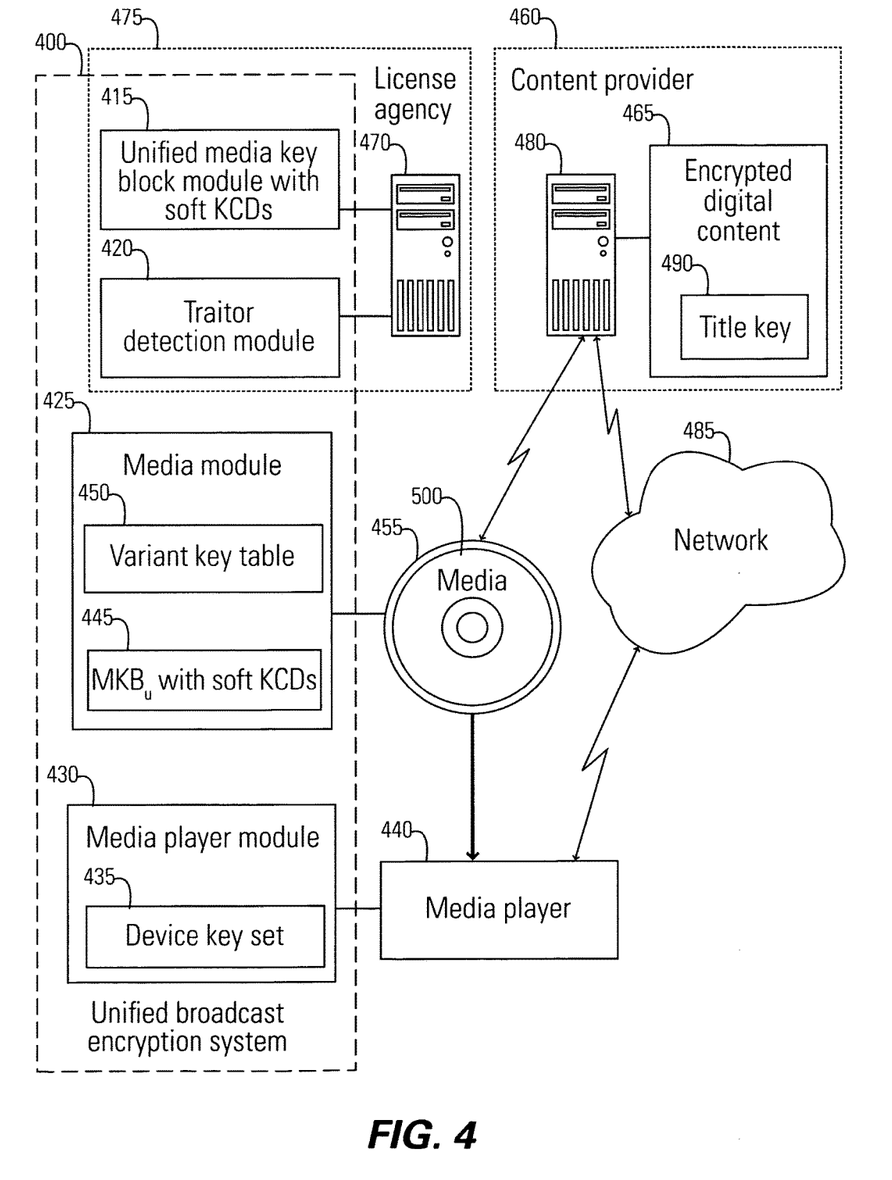
FIG. 4 is a schematic illustration of an exemplary operating environment of a unified broadcast encryption system incorporating soft key conversion data (KCD) in accordance with an embodiment of the invention.

FIG. 4 shows a system 400 for performing unified broadcast encryption and traitor tracing according to the present invention. In particular, the present invention performs unified broadcast encryption and traitor tracing using software key conversion data (KCDs). Key conversion data is a term used by AACS to describe a transformation on the media key in the media key block. Currently, the data for this transformation is encoded in a secret way on the movie disc; therefore, it is a hardware KCD, because it requires special disc drive hardware to read the data. The idea of a software KCD is that there is a program on the movie disc that also acts to transform the media key. Different devices can have different transformations, because different parts of the media key block could calculate different initial values.

In accordance with an embodiment of the invention, the media 455 includes a key transformation program 500. As in the system 10 shown in FIG. 1, in system 400, different media players 440 calculate different values from the unified media key block with soft KCDs 445 based on which part of the media key block their device uses. Some of these keys might be media key variants from the variant key table 450. In contrast to the system 10 shown in FIG. 1, however, other keys may be random values that need to be transformed by the key transformation program 500 on the media 455. The key transformation program 500 may be incorporated into existing programs on the disc. Examples of such programs, include, BD+, HDi, and BD-J.

System 400 includes a unified media key block with soft KCDs module 415, a traitor detection module 420, a media module 425, and a media player module 430. The media player module 430 comprises a device key set 435 that is uniquely associated with a media player 440. The media player module 430 further comprises a software programming code or a computer program product that is typically embedded within, or installed on the media player 440.

The media module 425 comprises a unified media key block with soft KCDs 445 (interchangeably reference herein as MKBu with soft KCDs 445) and a variant key table 450. The unified media key block with soft KCDs 445 comprises a subset of available device keys and a data part in which each of the subset of device keys individually encrypts a set of media key variants. For example, the subset of device keys may be organized in a tree structure, such as in the subset-difference broadcast encryption scheme, although all broadcast encryption schemes are within the scope of this invention. In accordance with the present invention, the media key block with soft KCDs 445 includes different keys in different parts of the media key block, just as with the media key block 45 shown in FIG. 1. However, in the media key block with soft KCDs 445, some of the keys may be random values that need to be transformed by a soft KCD transformation in a program on the media disc 455 as described in more detail in connection with FIG. 5. The media module 425 comprises a software programming code or a computer program product that is saved onto a media 455.

The unified media key block with soft KCDs module 415 generates one or more unified media key blocks incorporating soft KCDs for use by a content provider 460 to place on the media 455 together with an encrypted digital content 465 (interchangeably referenced herein as encrypted content 465). The unified media key block with soft KCDs module 415 comprises a software programming code or a computer program product that is typically embedded within, or installed on a server 470 that belongs to a separate facility, for example, a license agency 475. Alternatively, system 400 can be saved on a suitable memory or storage medium such as a diskette, a CD, a DVD, a hard drive, or like devices.

The traitor detection module 420 identifies the device keys that have been compromised by a traitor or have been pirated. The traitor detection module 420 passes the identified device keys to the unified media key block module 415 to revoke those identified device keys from any future unified media key blocks, preventing further piracy by that traitor or attacker. The traitor detection module 420 comprises a software programming code or computer program product that is shown, for illustration purposes only, as embedded within, or installed on server 470 of the license agency 475. Alternatively, the traitor detection module 420 may be installed in a separate facility other than the one that issues unified media key blocks to content providers.

The media player 440 can access a server 480 of the content provider 460 through a network 485 to obtain the encrypted digital content 465, a title key 490, and a key transformation program 500. The title key 490 (interchangeably referenced herein as Kt 490) allows the media player 440 to decrypt and play the encrypted content 465 after the encrypted content 465 has been recorded to media 455. The title key 490 is encrypted, and requires the media player 440 to correctly process the unified media key block 445 to decrypt and use the unified media key block 445. The content provider 460 may record the encrypted content 465, the encrypted title key 490, and the key transformation program 500 directly to the media 455 such as, for example, a CD or DVD. A user may then obtain the encrypted content 465 by, for example, purchasing the CD.

The media player 440 comprises any compliant module that can verify the physical presence of a media 455 such as, for example, a disk. A compliant module is one that follows the usage rules of the media module 425 that are cryptographically bound to media 455. For example, a compliant recorder does not record content encoded "do not copy".

Figure 5:
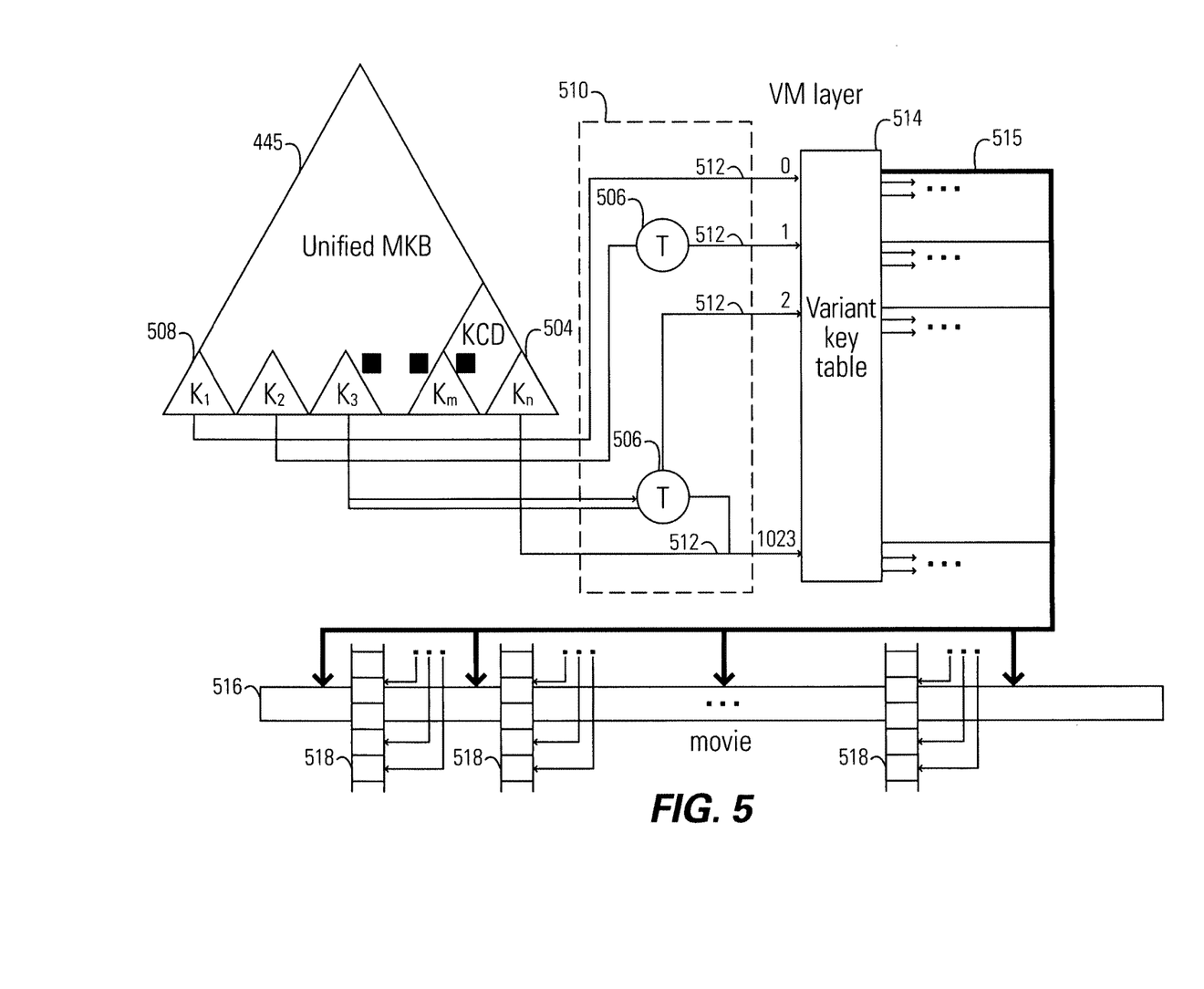
FIG. 5 is a schematic illustration of a unified broadcast encryption system incorporating soft KCDs in accordance with an embodiment of the invention.

FIG. 5 illustrates additional details of the operation of the system 400. In particular, the unified MKB 445 includes soft KDCs 502, which include a plurality of media keys 504. Some of the media keys 504 comprise random values that are transformed by a transformation process 506. The transformation process 506 may be performed by the key transformation program 500 on the media 510. Other media keys 508 may comprise media keys which are processed as described in system 10 shown in FIG. 1.

It is noted that the end result of the soft KCD transformation is a media key variant, not a media key as in the system 10 shown in FIG. 1. In the system 10 the number of media key variants was limited to about 1024, as shown by the media key variants 512 generated by the media 510. This limitation was a result of the extra space on the media 510 that was needed for the associated variations in the content. However, in accordance with an embodiment of the invention, with the system 400, some parts of the media key block with soft KCDs 445 can have initial values that are unpredictable to the attackers, such as random numbers, which are later transformed into one of the media key variants 512. Many initial values can be mapped into a single media key variant 512. Thus the previous limit of 1024 is eliminated. For example, the media key block with soft KCDs 445 might be divided into 32,000 different keys, or more. An attacker's platform must tell the truth about which of the keys it has, or the virtual program will not calculate the correct KCD as described in more detail below.

The media key variants 512 are input into a variant key table 514, which generates outputs 515 that enable the media player 440 to play the content 516 using the file segments 518 specified by the media key variants 512. This process is similar to that described above in connection with FIGS. 2 and 3.

One way to use the system 400 may be understood by considering a clone attack example where the attackers have built a circumvention program to allow users to make unauthorized copies of DVDs they have rented. The program has built in one or more device key sets, which the attackers have obtained illegally. It is now the job of a licensing agency to determine precisely which device key sets the attackers' program is using, so that they can be revoked in future media key blocks on newly released movies.

Figure 6:
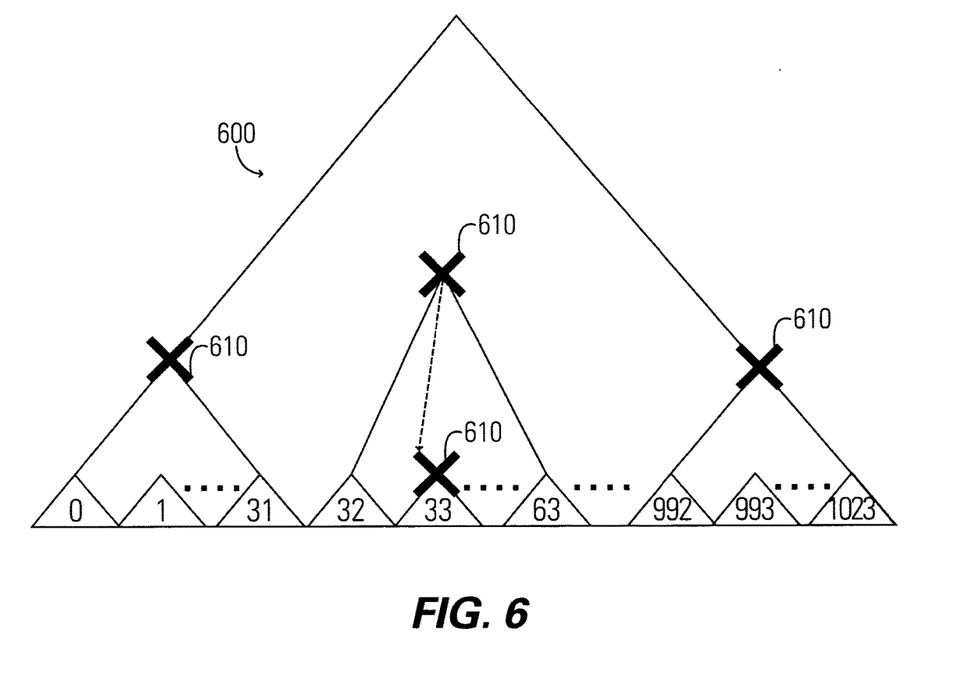
FIG. 6 is a schematic illustration of a unified media key block used with the unified broadcast encryption system incorporating soft KCDs in accordance with an embodiment of the invention.

Some of the advantages of this invention are shown in FIG. 6. Prior to this invention, the licensing agency builds a forensic disc, which has a movie with 1024 variations, a media key block 600 that generates 1024 media key variants. This figure shows a hypothetical current state of a forensic test where the attackers have 32 sets of device keys. The 'X's 610 show the current knowledge of the licensing agency—the agency knows the attackers have a set of device keys somewhere in the subtree rooted at each X, but does not know which actual leaf the attackers are at in each subtree. The licensing agency divides each of the attackers subtree into one of 1024/32 (=32) media key variants. After the test, the attackers must respond with one of the 1024 variations, and the licensing agency will now know that the attackers are in the subtree of that variation. In effect, one of the 'X's will have moved down the tree closer to the leaves. The licensing agency performs an additional test, subdividing the new smaller subtree. After each test, one 'X' will move down, and after enough tests all the 'X's will be at the leaves, meaning that the licensing agency knows precisely which key sets that attackers have. At that point, it is easy to revoke the attackers in newly released content.

Now consider the advantages of this invention. The licensing agency can now divide the tree into, for example, 32,000 subtrees. The licensing agency also builds a program that transforms those keys until they become one of the keys that encrypt one of the 1024 variations. The licensing agency purchases a copy of the circumvention program, and feeds it the forensic disc. The first thing the program on the disc asks the platform is: "where exactly are you in the media key block?". The platform must honestly answer with one of its device key sets; otherwise, the licensing agency's program will not perform the soft KCD transform correctly, and the platform will not be able to decrypt the movie to make the unauthorized copy. Note, as far as the platform knows, this disc is a legitimate movie that some end-user is asking it to copy. The licensing agency, once it knows the platform's answer to a given media key block, produces new media key blocks with a divide-and-conquer algorithm until it knows precisely which device key sets the clone has. Because it can subdivide the tree into much finer subtrees, it takes fewer tests to achieve success.

However, the disc's virtual program must figure out how to expose the platform's answer to the outside world. Note that, the virtual program is running in the circumvention platform, and a cleverly designed platform will be trying to protect the virtual program so that it cannot reveal the platform internals. Fortunately for the licensing agency, this is a very difficult problem for the attackers. For example, modern movie players contain complete non-volatile file systems, the purpose of which is to allow studios to support interactions between movies. For example, a disc with a movie sequel on it can use the file system to provide some data to enhance the playback of the disc of the original movie. If the circumvention program ignored the file system, then the studios could undoubtedly construct movie playbacks that would defeat the circumvention program. Thus, the forensic virtual program on the disc can use the file system, and can use not just file data, but file names, or even the offset of file seeks, to communicate information outside of the platform.

The present invention may set up an arms race between the licensing agency and the attackers. However, the licensing agency has all the advantages—the attackers must prevent all forensic ways; the licensing agency only needs to find one that works. And in the worst case, the licensing agency falls back to the 1024 variations built into the movies, which the attackers cannot get around. Note that the present invention does not change the basic tracing logic explained in the system 10 shown in FIG. 1. Instead, it greatly increases the speed and precision of the testing, and/or greatly complicates the attackers' job.

There are two additional details to consider. First, it is unnecessary for the virtual program on the disc to have access to the actual key values in the MKB. Consider the following example API, shown as pseudo-code:

```
public AppKeyHandle createKey(
        int key); // denotes title, device, media key, etc.
public AppKeyHandle deriveKey(
        AppKeyHandle key, // key to derive
        int op, // AND/OR/XOR/ADD/SUB/ROT/AES-G
        byte[ ] immediate);    // apply with op to key
        // (player checks all derivations of the media key
    // to see if it verifies)
```

The virtual program calls "createKey" to get a handle to a key in the media key block, not the actual key. It then instructs the secure layer to transform this key in various ways, using "deriveKey". Those skilled in the art will recognize that "AES-G" is AACS's terminology for a particular one-way function. After each transformation, the secure layer checks to see if the resulting key is a media key variant; if so, it has all the cryptographic information it needs to play the movie. Note that the person who designed the virtual program would need to know the actual key values in the media key block. However, with this type of interface, another person who did not know that information could not possibly write a virtual program to reveal it.

Figure 7:
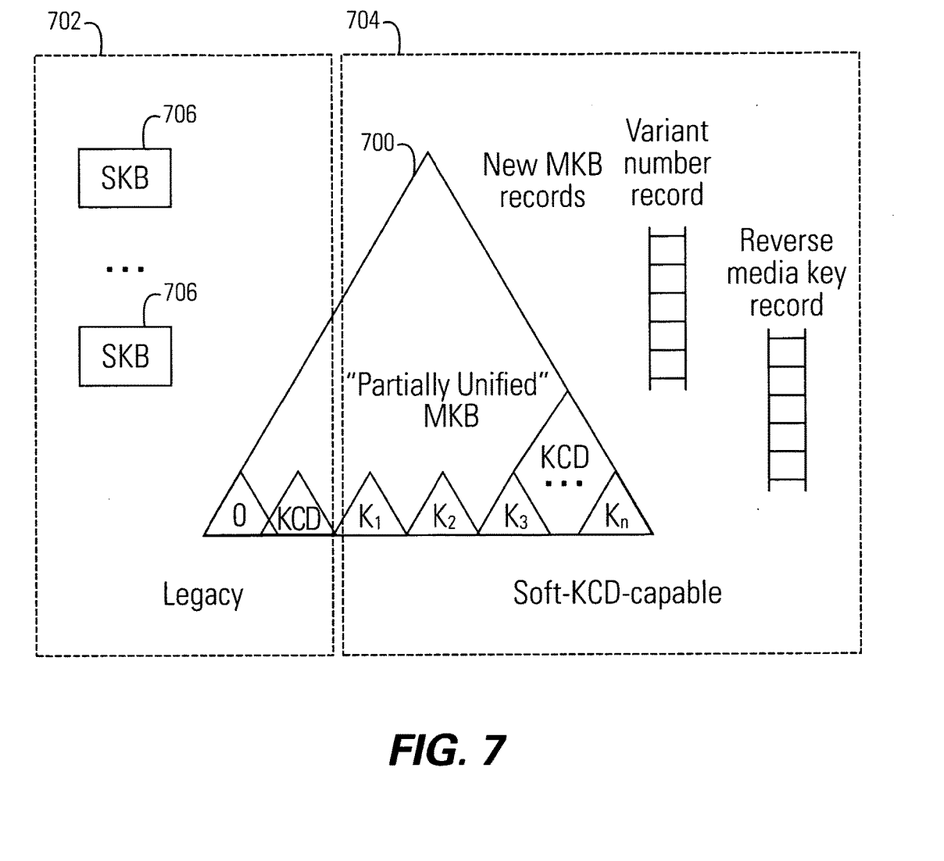
FIG. 7 is a schematic illustration of a unified media key block having compatibility with legacy devices used with the unified broadcast encryption system incorporating soft KCDs in accordance with an embodiment of the invention.

The second point to consider is that the present invention can be applied in a way that is backwards compatible with existing AACS players. As shown in FIG. 7, media key blocks 700 can be logically divided into two parts, the legacy part 702 and the new part 704. All existing devices would have device keys in the legacy part 702 and would calculate the media key directly from the media key block like they do today. They would also process Sequence Key Blocks 706 to determine the media key variants. However, new devices, designed to take advantage of the present invention, would be in the new part 704 of the media key block that was also taking advantage of the present invention. In other words, new devices would directly calculate media key variants or soft KCD precursor keys, as designed by the licensing agency.

Figure 8:
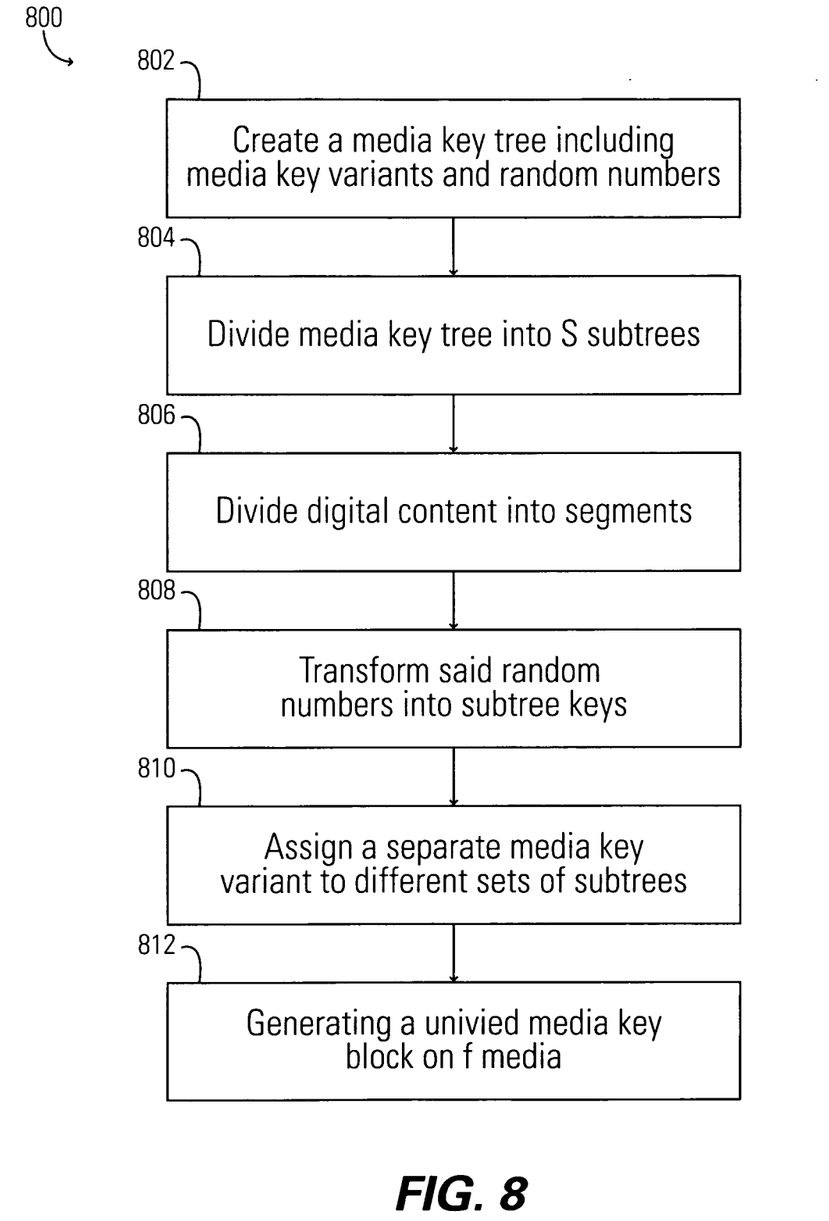
FIG. 8 is a flow chart of a process for encrypting digital content in accordance with an embodiment of the invention.

FIG. 8 is a flow chart of a process 800 for encrypting digital content in accordance with an embodiment of the invention. In step 802, a media key tree is created, which includes media key variants and random numbers. In step 804, the media tree is divided into S subtrees. A file containing the digital content to be encrypted is then divided into segments, in step 806. The random numbers are transformed into subtree keys in step 808. In step 810, a separate media key variant is assigned to different sets of subtrees. A media key block incorporating the above keys is then stored on the media containing the digital content in step 812.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method for a media device to decrypt protected content on media, said content being enabled to identify device keys in a compromised media device, comprising:
   processing a tree-based media key block to yield an initial value, wherein the tree-based media key block that has been divided into subtrees and a media device is associated with one of said subtrees;
   executing a key transformation program to transform the initial value into a media key variant, the media comprising said program;
   in response to the executing, the media device returning to the transformation program the media device's subtree identity;
   deriving title keys using the media key variant;
   decrypting said content using the title keys; and
   wherein said program: executes on said device when said device attempts to decrypt said content, transforms initial values into media key variations, and identifies to a content protection licensing agency which subtree among said subtrees is associated with said device.

2. A computer program product for a media device to decrypt protected content on media, said content being enabled to identify device keys in a compromised media device, the computer program product comprising a non-transitory computer readable storage medium having computer program code embodied therewith, said program code being readable/executable by said device to:
   process a tree-based media key block to yield an initial value, wherein the tree-based media key block that has been divided into subtrees and a media device is associated with one of said subtrees;
   execute a key transformation program to transform the initial value into a media key variant, the media comprising said program;
   in response to the executing, the media device returns to the transformation program the media device's subtree identity;
   derive title keys using the media key variant;
   decrypt said content using the title keys; and
   wherein said transformation program: executes on said device when said device attempts to decrypt said content, transforms initial values into media key variations, and identifies to a content protection licensing agency which subtree among said subtrees is associated with said device.

* * * * *